Patented Apr. 28, 1953

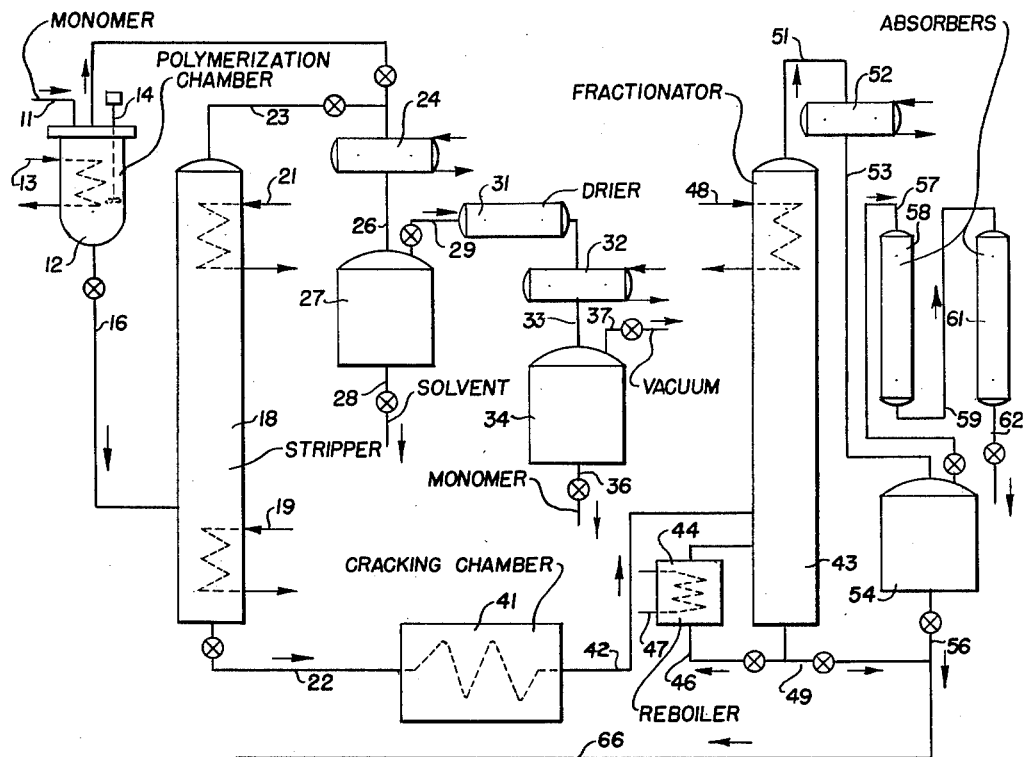
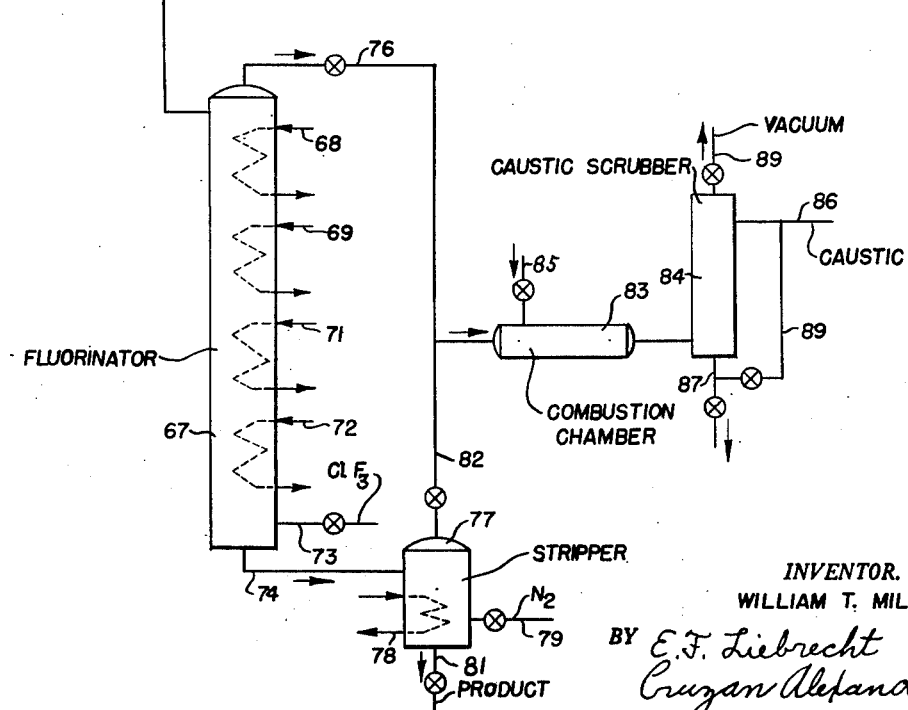

2,636,907

UNITED STATES PATENT OFFICE 2,636,907

MANUFACTURE OF HALOCARBON OILS

William T. Miller, Ithaca, N. Y., assignor to The M. W. Kellogg Company, a corporation of Delaware Application February 5, 1949, Serial No. 74,809

2 Claims. (Cl. 260—653)

This invention relates to the manufacture of halocarbons. In one of its aspects this invention relates to the manufacture of halocarbon oils of intermediate boiling range. In another aspect this invention relates to the fluorination of halocarbons, including unsaturated perhalocarbons. In one of its more particular aspects this invention relates to a process for the polymerization of perfluoro-olefins and perfluorochloroolefins to produce halocarbon oils, greases and waxes and the subsequent cracking of these materials to produce oils of lower molecular weight and boiling range followed by fluorination of the cracked product. Attention is drawn to my copending application Serial No. 720,478, filed January 26, 1947, which discloses the cracking of polytrifluorochloroethylene oils and waxes and subsequently fluorinating the cracked product with a free halogen or a metal halide.

Normally liquid halocarbon oils may be produced directly by the polymerization of perhaloolefins under appropriate conditions. However, this method of preparing halocarbon oils results in a product of relatively wide boiling range and a relatively low yield of oils within an intermediate boiling range. Moreover, the oils are somewhat unstable due to unsaturation and the presence of small amounts of hydrogen and must be subsequently halogenated for optimum chemical and physical properties.

It is an object of this invention to provide a continuous process for the production of halocarbon oils within an intermediate boiling range in high yields.

Another object of this invention is to provide a method for increasing the chemical and physical stability of cracked halocarbons.

A further object is to fluorinate unsaturated halocarbons.

Another object is to provide a method for the production of polytrifluorochloroethylene oils of an intermediate boiling range.

Various other objects and advantages of the present invention will become apparent from the accompanying description and disclosure.

As herein employed, halocarbons are defined as compounds consisting substantially exclusively of carbon and halogen with any degree of saturation and containing only negligible amounts of other elements such as hydrogen and oxygen in a quantity less than about 2 per cent. These other elements are derived from materials utilized in the process, as will hereinafter become apparent. Perfluoro-olefin is defined as a perhalo-olefin with any degree of unsaturation consisting of fluorine and carbon, and a perfluorochloro-olefin is defined as a perhalo-olefin consisting of fluorine, chlorine and carbon. The perfluorochloro-olefins of this invention are those containing not more than one chlorine atom per atom of carbon.

In accordance with this invention a perhaloolefin such as trifluorochloroethylene, tetrafluoroethylene, perfluorobutadiene, etc. is polymerized under conditions such that oils and greases at normal atmospheric tempeartures and hard waxes having softening points extending up to about 200° C. are produced. The product of the polymerization is separated from unreacted monomer and may be separated into fractions, such as oils, greases and waxes, and the polymerization products either singly or together are polymerized or cracked under appropriate conditions to split carbon-carbon bonds whereby a halocarbon oil of lower boiling range and of lower molecular weight than the aforesaid polymerization product is produced. The cracked halocarbon oil is separated from lower boiling halocarbons and may be further separated into particular fractions. The halocarbon fractions thus produced are fluorinated singly or in combination with each other with a halogen fluoride, such as chlorine trifluoride, to produce a normally liquid oil of relatively narrow boiling range having optimum chemical and physical characteristics. The fluorination treatment may involve addition of fluorine and/or replacement of hydrogen and chlorine with fluorine. The oils produced by the process of this invention generally boil within the range of about 100° C. to about 250° C. at 1 to 2 mm. of mercury pressure and include some high molecular weight residues. However, oils of narrower or wider boiling ranges may be produced by this invention without departing from the scope thereof. The boiling range of the oil product will depend upon such factors as the charging stock, conditions of polymerization and cracking, and various other factors, as will become apparent from the following description and disclosure.

For a better understanding of the present invention, reference will be made to the accompanying drawing which diagrammatically illustrates an arrangement of apparatus for the production of intermediate boiling halocarbon oils from the monomer, trifluorochloroethylene. However, it is to be understood that the integrated process as illustrated in the drawing may be applied to the production of intermediate boiling halocarbon oils from other monomers and perhalo-olefins, as previously mentioned.

The principal pieces of apparatus of the present invention comprise a polymerization chamber 12, a cracking chamber 41 and a fluorinator 67 and various purification and separation equipment for purifying and separating materials utilized and produced.

According to the drawing and the process illustrated, trifluorochloroethylene is the starting material and may be prepared by the dechlorination of trichlorotrifluoroethane (Freon 113) and purified in accordance with the teachings and disclosure in my prior and copending application Serial No. 14,797 filed March 13, 1948, now Patent No. 2,579,437. The monomer is introduced together with an appropriate chain transfer solvent and a promoter through conduit 11 into polymerization chamber 12. The monomer, solvent and promoter may be introduced continuously or intermittently, and separately if desired, into chamber 12. Element 13 represents a suitable heating or cooling means for maintaining polymerization chamber 12 at the desired temperature level. Numeral 14 designates a conventional stirrer for maintaining the contents of chamber 12 in an agitated condition during the polymerization.

Polymerization is effected under liquid phase conditions by employing a sufficiently high pressure at the temperature of polymerization. The temperature of polymerization will depend upon such factors as the particular promoter and chain transfer solvent employed and the molecular weight and boiling range of the product to be produced. In general, a suitable polymerization temperature will lie within the range of 0° C. to 300° C., preferably between about 70° C. and about 200° C. A suitable residence time is allowed for completing the desired reaction and obtaining the desired product. The residence time will range from a matter of seconds to as much as one hundred hours, preferably between about 1 minute and about 10 hours. Excess pressures over that necessary to obtain liquid phase operations may also be used, such pressures ranging as high as 25,000 pounds per square inch gage.

Promoters which are employed comprise organic peroxides and free oxygen. Examples of suitable promoters includes acyl peroxides such as acetyl peroxide, monochloro-dichloro and trichloroacetyl peroxides, fluoroacetyl peroxides, benzoyl peroxide, p-bromobenzoyl peroxide, and dichlorofluoroacetyl peroxide. Preferably for the polymerization of trifluorochloroethylene to oils, benzoyl peroxide is employed at a temperature between about 75° C. and about 175° C. The weight ratio of promoter to monomer charged is between about 1:10 to about 1:200, generally being between about 1:15 to 1:50. Increasing the amount of promoter decreases the molecular weight of the resulting product.

Suitable chain transfer solvents include chloroform, carbon tetrachloride, 1,1,2,2-tetrachloroethylene, 1,2-dichloroperfluoro cyclobutane and trichloroethylene. The weight ratio of solvent to monomer charged is usually between about 10 to 1 to about 1 to 5 and increased amounts of solvents result in lower molecular weight products of the polymerization. In the process illustrated in the drawing, chloroform is employed as the chain transfer solvent.

The product produced by the polymerization has a boiling range between about 50 and about 350° C. at 1-2 mm. of mercury pressure, but the exact boiling range will depend upon the various operating conditions and promoter and solvent employed. The waxes produced by the polymerization under the conditions of this invention, including hard waxes, have softening points as high as 200° C. A portion of the product will usually consist of both waxes and greases; that portion may be between about 10 and about 50 per cent by volume of the total product. Conversion as high as 50 per cent of monomer charged, or better, is possible under optimum conditions of operation.

Thermal polymerization may be employed without the use of promoters and/or chain transfer solvents but generally with small amounts of free oxygen to obtain an oil product. For thermal polymerization, relatively higher temperatures and pressures are necessary.

Polymerization products are withdrawn from chamber 12, continuously or intermittently, through conduit 16 and passed to a stripper 18. In intermittent operations, normally gaseous components of reaction chamber 12 are withdrawn therefrom through conduit 17. In stripper 18 unreacted monomer, chloroform, promoter residue, and relatively low boiling halocarbons are stripped from the polymerization products. Numeral 19 designates a conventional heating or cooling means for obtaining the desired bottoms temperature in stripper 18. The bottoms temperature of stripper 18 when polymerizing trifluorochloroethylene is usually maintained above room temperature, usually about 80 to 90° C. Numeral 21 designates a conventional cooling or heating means for maintaining the temperature of the top of stripper 18 at the desired value. If desired, heat exchanger means 21 may be omitted. The top temperature of stripper 18 is maintained usually at a temperature lower than the bottom temperature and preferably, when polymerizing trifluorochloroethylene, at a temperature about 65° C. at atmospheric pressure, depending upon the desired materials to be passed overhead from stripper 18. Stripper 18 may include suitable packing or baffle plates therein to obtain efficient operation.

The overhead product comprising unreacted monomer and the solvent chloroform is withdrawn from stripper 18 through conduit 23 and combined with any gaseous materials in conduit 17 and passed to condenser 24 which is maintained at a sufficiently low temperature to condense substantially all of the chain transfer solvent. In the case of chloroform, condenser 24 is maintained at a temperature of about 60° C. or lower. Condensate and uncondensed vapors are passed from condenser 24 to accumulator 27 through conduit 26.

Condensate comprising the chain transfer solvent is removed from accumulator 27 through conduit 28 and is recycled by means not shown to polymerization chamber 12. Uncondensed vapors comprising the monomer trifluorochloroethylene are removed from condenser 27 and passed through conduit 29 to a drier 31. Drier 31 contains phosphorous pentaoxide or silica gel, or both, for the removal of hydroxy compounds from the monomer. The dried monomer vapors are passed from drier 31 to condenser 32 where the vapors are cooled to a temperature of about −27° C., at which temperature the monomer is condensed. Condensed monomer and any uncondensed vapors are passed from condenser 32 through conduit 33 to an accumulator 34. Condensate is removed from accumulator 34 by means of conduit 36 and is recycled by means not shown to polymerization chamber 12. Uncondensed vapors are removed from accumulator 34 through conduit 37 by means of a partial vacuum.

The crude halocarbon oils separated in stripper 18 substantially free from chain transfer solvent and promoter residue are removed from the bottom thereof by means of conduit 22 and are passed to a cracking chamber 41 where the oils are cracked to a product of lower boiling point and lower molecular weight. The crude halocarbon oils are passed through stainless steel coils immersed in a lead bath maintained at a temperature between about 330 and about 400° C., preferably between about 350° C. and about 375° C., at which temperature the polytrifluorochloroethylene oils and waxes are cracked. The cracking feed may be introduced in either the vapor or liquid phase depending on the composition and character thereof, as desired. Higher temperatures such as 600° C. may be used for cracking without departing from the scope of this invention. At the preferred temperature range the residence time of the oil in the cracking coils of chamber 41 will generally be between about 10 seconds and about 2 hours, depending upon the degree of cracking desired, type of apparatus and manner of operation. Cracking of the crude halocarbon oils and waxes to intermediate oil increases the yield of oil in the intermediate boiling range in some instances as much as 50 per cent or more over that which could be obtained by direct polymerization.

The cracking effluent is passed in the vapor or liquid phase from cracking chamber 41 through conduit 42 to fractionator 43, where it is introduced at an intermediate point. A reboiler 44 is employed to maintain the desired bottom temperature of fractionator 43 and a portion of the liquid bottoms product is circulated through conduit 46 and reboiler 44 and returned to fractionator 43. Element 47 is a conventional heat exchanger for maintaining the desired temperature of the reboiler which is generally between about 200 and about 350° C. at a pressure about 1–2 mm. of mercury. A cooler, not shown, may be positioned on conduit 42 for cooling or condensing the inlet feed to fractionator 43. The bottoms product comprising halocarbon oils boiling above about 250 to 350° C. is removed from fractionator 43 by means of outlet conduit 49. All or a portion of the bottoms product from fractionator 43 may be recycled to cracking chamber 41 by means not shown.

Numeral 48 designates a cooling coil in the upper portion of fractionator 43 for maintaining the top temperature of the fractionator at the desired level, preferably between about 100 and about 300° C. An overhead vaporous fraction comprising relatively low boiling halocarbon oils and small quantities of monomer, hydrogen fluoride and hydrogen chloride, is removed from fractionator 43 and passed through conduit 51 to condenser 52. Condenser 52 is maintained at a temperature below about 100° C. to condense substantially all of the halocarbon oils. Condensate is passed from condenser 52 through conduit 53 to accumulator 54. Condensate from accumulator 54 comprising relatively low boiling halocarbon oils is removed from accumulator 54 through conduit 56. A portion of this condensate may be recycled to the upper portion of fractionator 43, by means not shown, as a reflux, or may be recycled to cracking chamber 41, if desired, by means not shown. Uncondensed vapors comprising monomer, hydrogen fluoride and hydrogen chloride are removed from accumulator 54 through conduit 57 and passed to absorber 58, which contains sodium fluoride. In absorber 58 hydrogen fluoride is absorbed. The remainder of the gaseous material comprising monomer and hydrogen chloride is passed from absorber 58 through conduit 59 to absorber 61, which contains caustic such as solid sodium hydroxide. In absorber 61 hydrogen chloride is removed from the gases. The remaining gases comprising monomer and any accompanying gaseous halocarbons are removed from absorber 61 through conduit 62 by means of a partial vacuum, and may be recycled to reactor 14, if desired.

The fluorocarbon oil fractions in conduits 49 and/or 56 and/or any intermediate fractions withdrawn from fractionator 43 by means not shown are now treated under fluorination conditions to improve the physical and chemical characteristics of these oils. These oils may be separately treated or may be combined for treatment, as desired. In this description the oils are combined for treatment by introduction into conduit 66 through which they are passed to fluorinator 67. Fluorinator 67 comprises an elongated vertical tower having a plurality of spaced heat exchange means 68, 69, 71 and 72 along the length of the tower. The halocarbon oils to be fluorinated are introduced into the upper portion of column 67 where the temperature is maintained between about 150 and about 200° C. by means of heat exchanger 68 through which a suitable cooling medium is circulated at the appropriate temperature, or in which a liquid is boiled under pressure at the desired temperature to be maintained in the upper portion of fluorinator 67. Halocarbon oils are passed downwardly through fluorinator 67 countercurrently to an upwardly flowing stream of chlorine trifluoride introduced at the bottom of column 67 through inlet conduit 73. Preferably, column 67 is maintained under gradual increasing temperature gradients from top to bottom so that the temperature of the halocarbon oils removed from column 67 through bottom outlet conduit 74 is about 250° C., or higher. Fluorination may be effected at a substantially constant temperature from top to bottom of column 67 without departing from the scope of this invention. Vapors comprising unreacted chlorine trifluoride, hydrogen chloride, hydrogen fluoride, etc. are removed from the upper portion of column 67 through conduit 76.

The fluorinated oils from column 67 are passed through conduit 74 to a stripper 77. Numeral 78 designates a heat exchange means for maintaining the desired temperature of the oils in the lower portion of stripper 78. Generally, in the case of polytrifluorochloroethylene oils, the temperature is maintained at about 100 to 250° C. Nitrogen is bubbled through the liquid phase in stripper 77 by introduction therein through conduit 79. Halocarbon oils substantially completely saturated are removed from stripper 77 through outlet conduit 81 as the product of the process. This oil product may be further separated into desired fractions, such as by fractional distillation.

Stripped chlorine trifluoride together with any hydrogen chloride, hydrogen fluoride and free fluorine and chlorine obtained by stripping the fluorinated oils are removed from the upper portion of stripper 77 through outlet conduit 82 and are combined with the vapors in conduit 76. The combined vapors are passed to a combustion chamber 83 in which any free fluorine and chlorine are burned with hydrogen. Hydrogen is introduced into combustion chamber 83 through conduit 85. The combustion effluent comprising acidic compounds is removed from chamber 83 and passed to the lower portion of a caustic scrubber 84 in which vapors are passed upwardly countercurrent to a downwardly flowing caustic solution, such as an aqueous solution of sodium hydroxide. Rich scrubbing solution is removed from caustic scrubber 84 through outlet conduit 87. A portion of the rich scrubbing solution may be withdrawn and another portion recycled through conduits 88 and 86 to the upper portion of scrubber 84. Fresh caustic solution is introduced into scrubber 84 through conduit 86. Vapors substantially free from acidic compounds are removed from caustic scrubber 84 through conduit 89 by means of a partial vacuum.

EXAMPLE

Chloroform, trifluorochloroethylene and benzoyl peroxide (wet—10% water by weight) were introduced into a steam jacketed reaction bomb of stainless steel equipped with a stirrer. The weight ratio of monomer to chloroform was about 2:3 and the amount of peroxide based on the monomer charge was about 6 per cent by weight. The temperature was held at 212° C. for about six hours and the initial pressure was about 200–255 pounds per square inch gage and decreased to 90 pounds per square inch gage at the end of the six hour period. After the polymerization was completed the pressure was released from the reaction bomb and it was held at a temperature of about 40 to about 50° C. to remove unreacted monomer. The temperature was then raised to about 100° C. to remove chloroform. The temperature was then raised to about 160° C. at a vacuum of about 53 cm. of mercury to remove final traces of monomer and chloroform.

The yield of polymer based on the monomer charged was about 90 per cent and had the consistency of soft wax at room temperature.

Polymer prepared in the above manner was charged to a conventional vacuum distillation apparatus for cracking. The distillation still was raised to a temperature of about 150° C. at 288 millimeters of mercury pressure. The vapor temperature during this period of operation was about 45° C. As the distillation was continued, the pressure was decreased to about 0.5 millimeter of mercury with a corresponding increase in still temperature to about 210° C. and a vapor temperature of about 155° C. The overhead product to this point contained all of the light oil with traces of chloroform and other undesirable constituents which are not suitable for cracking. This cut was collected and separated. The pressure was then increased to 25 to 30 millimeters to start the cracking operation period. At this pressure an initial kettle temperature of about 180° C. and a vapor temperature of about 40° C. were obtained. The cracking operation was completed at a temperature of about 380° C. and a vapor temperature of about 270° C. and a pressure of 25 millimeters. The residue amounted to about 2 per cent or less of the product. The yield of cracked oil based on monomer charged was about 85 per cent.

1005 grams of the cracked polymer oil, having a Gardner viscosity of 20 poises, were treated slowly and continuously with a total of 215 grams of chlorine trifluoride using temperature stages of 100° C., 150° C. and 200° C. Table I below gives the conditions of the fluorination procedure:

Table I

| Temp., ° C. | Reaction Time in Hours | ClF$_3$ Used [1] in Gms. |
|---|---|---|
| 100 | 1.73 | 92 |
| 150 | 1.30 | 40 |
| 200 | 2.42 | 83 |

[1] The amount of ClF$_3$ added during the reaction does not necessarily indicate the amount which reacted.

The temperature during the fluorination reaction was not increased until the reaction showed signs of stopping at the lower temperature. Thereafter, the temperature was increased in accordance with the above. Samples were withdrawn from the reactor at the end of each temperature stage for permanganate (acetone solution) stability and Gardner viscosity determinations. The results of these tests are shown in Table II below:

Table II

| Temp., ° C. | Gardner Vis. in Poises | KMnO$_4$ Test |
|---|---|---|
| 100 | 58 | Pos. Immed. |
| 150 | 36.2 | Pos. Slowly. |
| 200 | 22.7 | Pos. Very Slowly. |

The cracked oil treated with chlorine trifluoride was subsequently treated with excess cobaltic fluoride at 250° C. for one hour. The oil thus subjected to both chlorine trifluoride treatment and cobaltic fluoride treatment gave an excellent permanganate (acetone solution) test indicating substantially complete saturation.

Another portion of the cracked oil comprising 5,147 grams was treated with chlorine trifluoride at a final temperature of 250° C. without the subsequent cobaltic fluoride treatment. In this treatment, 328 grams of chlorine trifluoride were used while gradually increasing the temperature from 100 to 205° C. over an initial period of seven hours. The chlorine trifluoride was added at such a rate that very little unused chlorine trifluoride passed through the reactor. The final treatment was carried out at a temperature of 240 to 250° C. with an additional 426 grams of chlorine trifluoride for a period of 5½ hours. The recovered fluorinated oil was water white and gave an excellent permanganate (acetone solution) stability test.

Various alterations and modifications of the present invention may become apparent to those skilled in the art. Certain pieces of equipment, such as pumps, coolers, storage tanks and recycle lines, have been omitted from the drawing as a matter of convenience and clarity, and their location and use will become apparent to those skilled in the art without departing from the scope of this invention. It is also contemplated that small amounts of solid polymer scraps of trifluorochloroethylene may be incorporated with the cracking feed. The fluorination procedure applies to various unsaturated halocarbons, such as mono-olefins and diolefins including perfluoro-olefins and perchloro-olefins.

I claim:

1. A process for stabilizing a halocarbon oil prepared by cracking at a temperature between about 330° C. and about 600° C. a relatively high molecular weight polymer of trifluorchloroethylene having a maximum softening point not greater than about 200° C. to produce a lower molecular weight oil and monomer and separating said oil from monomer, which comprises fluorinating at least a portion of the separated oil with chlorine trifluoride at a temperature between about 150° C. and about 250° C. to substantially saturate said oil, maintaining a temperature within the lower portion of said temperature range during the initial portion of said fluorination and a temperature within the upper portion of said temperature range during the final portion of said fluorination, and recovering a substantially saturated halocarbon oil as a product of the process.

2. A process for stabilizing a halocarbon oil prepared by cracking at a temperature between about 330° C. and about 600° C. a relatively high molecular weight polymer of trifluorochloroethylene having a maximum softening point not greater than about 200° C. to produce a lower molecular weight oil and monomer and separating said oil from monomer, which comprises fluorinating at least a portion of the separated oil with chlorine trifluoride at a temperature between about 150° C. and about 250° C. to substantially saturate said oil, maintaining a temperature within the lower portion of said temperature range during the initial portion of said fluorination and a temperature within the upper portion of said temperature range during the final portion of said fluorination, stripping said oil with nitrogen of undesirable components acquired during halogenation and recovering a substantially saturated halocarbon oil as a product of the process.

WILLIAM T. MILLER.

References Cited in the file of this patent

UNITED STATES PATENTS

| Number | Name | Date |
|---|---|---|
| 1,961,622 | Nutting et al. | June 5, 1934 |
| 2,410,541 | Joyce | Nov. 5, 1946 |
| 2,411,159 | Hanford | Nov. 19, 1946 |
| 2,420,222 | Benning | May 6, 1947 |
| 2,436,069 | Joyce | Feb. 17, 1948 |
| 2,471,831 | McBee et al. | May 31, 1949 |
| 2,480,560 | Downing et al. | Aug. 30, 1949 |
| 2,489,970 | McBee et al. | Nov. 29, 1949 |

OTHER REFERENCES

Ruff et al.: Z. Anorg. allgem. Chem., vol. 190, pp. 270–6 (1930).

Miller: Jour. Am. Chem. Soc., vol. 62, pp. 341–4 (1940).

Booth et al.: Chemical Reviews, vol. 41, pp. 421–2, 436–9 (1947).